June 16, 1953  R. D. PIKE  2,642,338
METHOD OF AND APPARATUS FOR PRODUCING NITRIC OXIDE
Filed Feb. 12, 1944  2 Sheets-Sheet 1

INVENTOR.
ROBERT D. PIKE.
BY Fay, Goirick, Chilton & Isler.
Attorneys.

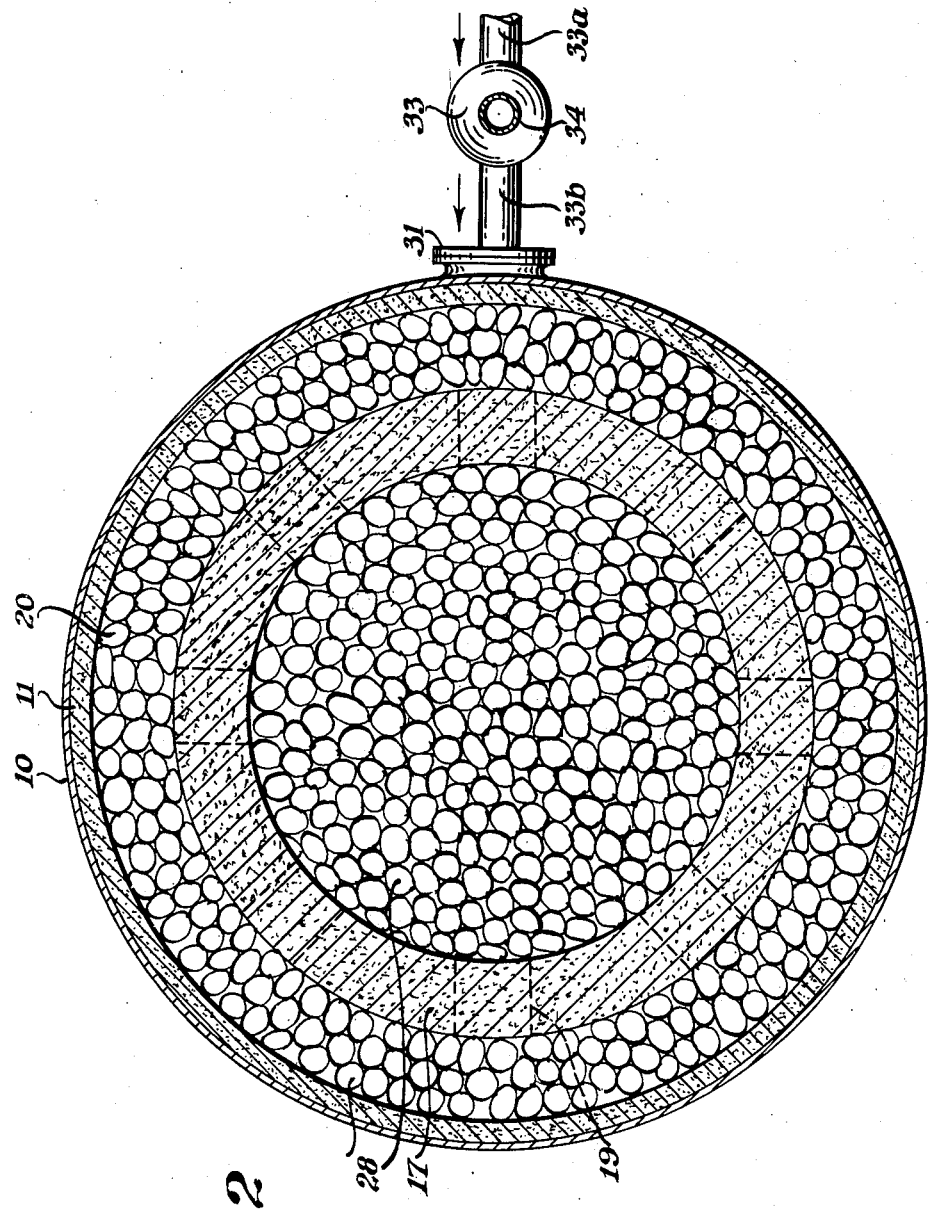

Patented June 16, 1953

2,642,338

UNITED STATES PATENT OFFICE 2,642,338

METHOD OF AND APPARATUS FOR PRODUCING NITRIC OXIDE

Robert D. Pike, Pittsburgh, Pa.

Application February 12, 1944, Serial No. 522,044

7 Claims. (Cl. 23—163)

The present invention relating, as indicated, to the method of and apparatus for making nitric oxide is directed to an improved method and apparatus for the production of nitric oxide from air and represents a continuation-in-part of my copending applications Serial Nos. 482,426, now U. S. Letters Patent No. 2,512,259, issued June 20, 1950, and 484,815, now abandoned, both of which are also directed to the production of nitric oxide from air.

The principal object of the present invention is the provision of an improved method and apparatus particularly adapted to produce nitric oxide from air through the reaction described in my copending applications while, at the same time, maintaining substantially the maximum content of almost 3% nitric oxide as it is produced in the reaction step of the process. I accomplish this desirable result in the present invention by effecting practically instantaneous chilling of the gas at 4200 to 4300° F., as it issues from the reaction zone of the furnace. I have observed that the most critical range of very rapid cooling is at this temperature and for a short range below it, down to approximately 3800° F. Through this range both the formation from and the decomposition of nitric oxide into nitrogen and oxygen are extremely rapid and, by taking advantage of this fact and effecting an almost instantaneous chilling of the nitric oxide produced at 4200 to 4300° F. or even higher, the maximum yield can be secured. At the lower end of the temperature range the rate of decomposition is considerably less rapid than at the upper limit and the rate of decomposition continues to decline rapidly as the temperature is still further reduced below 3800° F.

The decomposition of the nitric oxide is overcome in a substantial measure in the methods described in my copending applications by the so-called overblowing of air through the regenerative pebble beds on their air heating cycle. This has the beneficial effect of cooling the pebbles several hundred degrees so that when the nitric oxide containing gas leaving the reaction zone comes into contact with them its rate of chilling is greatly accelerated, but in the preceding method the overblown air had to be withdrawn from the furnace at about 3400° F. and the large amount of heat which it contained had to be utilized elsewhere for reasons of economy.

In my present invention I maintain the advantage of passing the nitric oxide containing gas into a bed of pebbles (or refractory particles) maintained at a relatively low temperature which may be reached in part by the use of overblow, but I have eliminated the necessity for withdrawing overblown air at a high temperature from the furnace.

In my present invention I also greatly accelerate the rate of chilling of the nitric oxide containing gas leaving the reaction zone at its maximum temperature of 4200–4300° F., or even higher by intimately mixing with it a substantial volume of nitric oxide containing gas at a lower temperature. The volume and temperature of this gas, which is preferably, recycled, from a point further on in the system are so chosen as to cause violent mixing and almost instantaneous chilling of the nitric oxide containing gas issuing from the reaction zone at its maximum temperature to about 3800° F. In order to do this effectively the recycled gas must not be at too low a temperature because if so its volume will be too small, or if the volume is made adequate, excessive heat losses will result, causing too great a reduction in temperature of the mixed gas. I have found that about 3000° F. is a suitable temperature for the recycled gas at the point of mixing. This gives it a large volume, causing almost instantaneous chilling to about 3800° F. The heat from 3800° F. down to about 400–600° F. is then recovered in a pebble bed, which at the same time continues the rapid chilling of the mixed gas.

A further object of the invention is to withdraw the recycled nitric oxide containing gas from a point in the system exteriorly of the furnace where its temperature is low, say 100–200° F., and to heat it to about 3000° F., preparatory to mixing, with heat abstracted in a pebble bed from the overblown air and/or with heat supplied by radiation and conduction through the refractory walls which enclose the reaction zone of the furnace.

A further object of the invention is the simplification of the entire furnace design by operating the overblow and shock chilling steps by mixing with nitric oxide containing gas in a self-contained manner within the furnace and without the necessity of installing steam generators and also with a very considerable reduction in the amount of overblow on the air heating cycle and with an improved economy in the utilization of fuel.

To the accomplishment of the foregoing and related ends, said invention, then, consists of the means hereinafter fully described and particularly pointed out in the claims; the annexed drawing and the following description setting forth in detail certain means and one mode of carrying out the invention, such disclosed means and mode illustrating, however, but one of various ways in which the principle of the invention may be used.

In said annexed drawing,

Fig. 2 is a horizontal section on the line 2—2 of Fig. 1.

Figure 1:
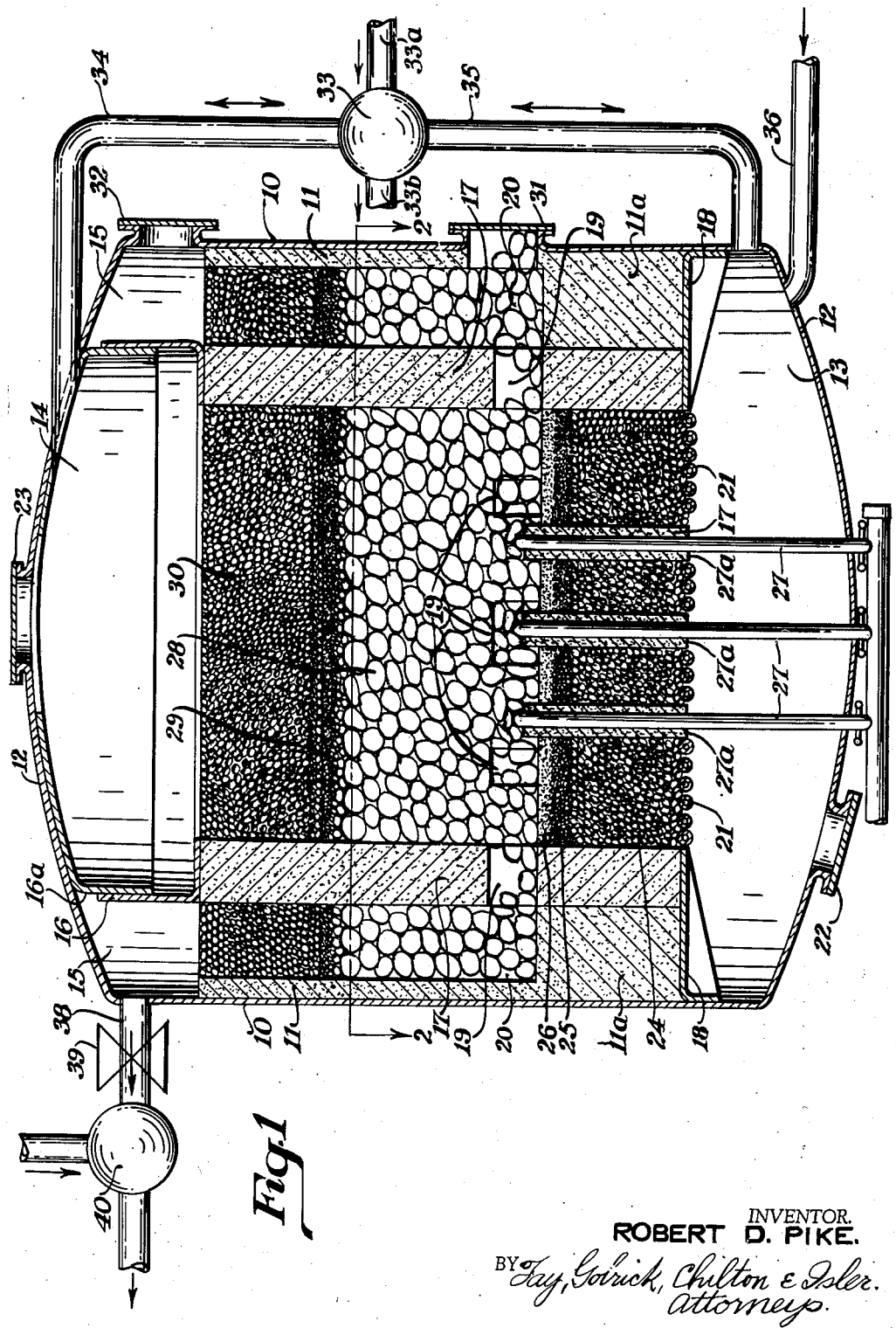
Fig. 1 is a vertical cross sectional view of my improved apparatus.

Referring now to the drawing, my improved apparatus consists of a vertical steel cylindrical gas tight shell 10 which is provided with the necessary pipe and flue connections, hereinafter described, and lined with a suitable refractory lining 11. A dished head 12 provides a gas tight pressure resisting closure at the bottom enclosing a windbox 13, while a similar head 12 provides the upper or top closure and encloses the main windbox 14, and the annular secondary windbox 15 separated from the main windbox by a steel partition 16. The steel partition 16 is formed in two portions and joined by an expansion joint 16a necessary to accommodate shrinkage of the furnace lining 17 to which the lower half 16 of the partition is attached. Within the shell is a refractory lining 17 of high grade magnesia which may either be built up from bricks or may be rammed in place. This lining is supported on a bottom steel shelf 18 and is continuous from this level to its junction with the partition 16, except for the peripheral ports 19. The lining 17 forms the furnace chamber proper and may be conveniently 10 to 15 feet in internal diameter and from 9 to 18 inches thick.

Between the lining 17 and the lining 11, which are concentrically disposed, is an annular space 20 which, in practice, may have a cross sectional area about ¼ to ½ that of the cross sectional area within the lining 17. The furnace is closed at the bottom by a water cooled grate 21 which is made removable so that the charge of the furnace may be dumped through a discharge gate 22. A similar gate or manhole 23 at the top allows entrance to the furnace and the deposit therein of the filling of refractory fragments.

Within the chamber bounded by the furnace wall 17 are a series of beds as follows: A lower regenerative pebble bed 24 is made up of particles of fused magnesia (periclase), usually of a size graded between ½ inch and 1 inch, although they may vary above or below these limits. This bed should be from 3 to 5 feet thick. On top of it is a second bed 25 of "macadam" of the same material but 5 to 6 inches thick, and on top of this is a third bed 26 of the same material 2 to 3 inches thick and of smaller particle size, which may be between 4 to 10 mesh. The macadam particles range in size between the smaller particles of the bed 26 and the larger particles of the bed 24. Their purpose is to prevent the small particles of the bed 26 sifting down into the interstices between the larger particles of the bed 24. It will be noted that the upper edge of the bed of fine particles 26 substantially coincides with the lower level of the ports 19 in the furnace wall.

Water cooled gas pipes 27 disposed in refractory sleeves 27a extend upwardly through the bottom closure 12 and through the beds 24, 25 and 26, terminating at or near the upper edge of the ports 19. One of these fuel gas pipes is usually provided for each three or four feet of cross sectional area within the lining 17.

A combustion or reaction bed 28 is disposed on top of the three beds already referred to and is formed of particles of fused magnesia usually 3″–6″ in size in a depth preferably not less than five feet or deeper. On top of this bed 28 is a layer of macadam 5 to 6 inches thick forming a bed 29, and above this and resting on it is the upper pebble bed 30 of the same characteristics as the lower pebble bed 24.

The annular space 20 surrounding the inner furnace chamber proper is also filled with particles, preferably of fused magnesia, of the same size as those of the bed 28, although they may be smaller in size. This bed should extend from the ports 19 to the same level in the annular space 20 as the top of the bed 28. Above this bed in the space 20 are other beds corresponding in depth and constituency with the beds 29 and 30 in the central chamber. In other words, except for the lower annular space below the ports 19, which is filled with brickwork 11a, the annular space 20 between the outer furnace wall 11 and the inner concentric wall 17 has substantially the same filling material, arranged in the same type of beds, as the inner furnace proper. Manholes 31 and 32 in the outer wall 10 are provided to place this filling or to remove it.

Connected to the upper and lower portions of the furnace, that is above and below the beds described above, are air conduits 34 and 35, respectively, which are connected to a reversing valve 33 which may divert incoming air from a supply air conduit into either of these conduits 34 or 35. The same pipes 34 and 35 serve to conduct the nitric oxide bearing flue gas or air, respectively, from the furnace to the adsorption plant (not shown), but connected to the valve 33 by a conduit 33b.

The overblowing is accomplished through an overblow pipe 36, connected to the windbox 13, and air supplied through this conduit is in addition to the air supplied through the pipe 35 on the upstream cycle. This overblow conduit 36 may be controlled by a valve, not shown, operated in step with the reversing valve 33 to turn the air on or off at appropriate intervals.

Another conduit 38, connected to the secondary windbox 15, is provided for the purpose of admitting cooled nitric oxide containing gas to the secondary windbox 15 on the downstream cycle and this conduit 38 also serves as a vent for the overblown air which may be used in the upstream cycle. Flow in either direction in the pipe 38 is controlled by means of a valve or damper 39. This conduit 38 then goes to a reversing valve 40 which passes overblown air to the stack on the upstream cycle or recycled cold nitric oxide containing gas to the windbox 15 on the downstream cycle. The cold recycled nitric oxide containing gas, just referred to, is the product of the furnace. This gas leaves the furnace at a temperature of about 600° F. and should preferably be cooled by a water spray to about 95° F.

Air is ordinarily supplied to the reversing valve 33 at about 7 pounds per square inch in an amount which may be equal to 250–350 standard cubic feet per minute per square foot of cross sectional area within the furnace lining 17 and overblow may be provided up to about 30% of this amount, but, as will presently appear in this description, the use of all or any part of this overblow is optional since the equivalent effect may be obtained by overblowing up to about 50% or even more of the total net flow within the furnace lining 17 of cold recycled nitric oxide containing gas into the windbox 15 on the downstream cycle. However, I ordinarily prefer to use at least 15% overblow because this helps to heat the recycled gas to the desired temperature of about 3000° F. In the entire absence of overblow heat radiated through the furnace wall would have to be depended upon entirely to heat the recycled gas, and ordinarily this is scarcely sufficient.

The operation of the present apparatus on the two cycles, upstream and downstream, is as follows. On upstream operation air is supplied down through the pipe 35 into the windbox 13 and then up through the pebble bed 24. The main stream of this air is thus preheated in the pebble bed and passes on up through the combustion or reaction bed 28, where it mingles with the gaseous fuel supplied through the conduits 27, and burns in the interstices among the hot fragments of periclase of the combustion or reaction bed. With natural gas the ratio of air to fuel in the bed 28 may vary from about 12 to 1 to 24 to 1. The gaseous fuel is preferably injected at high velocity through the water cooled pipes 27 and produces a temperature in the bed 28 above the ports 19 of from 4200 to 4300° F. The necessity for obtaining the desired temperature will control the precise air fuel ratio which may be employed with whatever type of gas is used. During this operation, some of the air, known as the overblow in my earlier applications, which may be introduced through the overblow pipe, may be withdrawn through the ports 19 and this air should have a temperature of about 3200 to 3400° F. This escaping air will impart its heat to the bed of particles in the annular space 20 and is withdrawn through the pipe or conduit 38 at about 600° F. Its flow is controlled by the damper 39 and is passed through the reversing valve to the stack, and there wasted.

The flue gas passing up through the pebble bed 30 imparts its heat to the pebbles and issues through the top of the bed into the main windbox and then passes from the top of the furnace chamber through the conduit 34 to the reversing valve 33. This flue gas produced on the upstream cycle will ordinarily contain from .8 to 1.1% nitric oxide or even more and may either be discarded through the stack or go to the adsorption system (not shown), as desired. The relatively low content of nitric oxide in the flue gas resulting from the upstream cycle is caused by the relatively slow cooling in the bottom of the bed 30, and also from the relatively low percentage of oxygen present because of the combustion of the fuel. The upstream or fuel cycle usually lasts from 5 to 15 minutes.

On the downstream cycle the reversing valves 33 and 40 are reversed. Air is then directed through the pipe 34 ordinarily in the same quantity as has formerly passed through the conduit 35 on the upstream cycle, into the main windbox 14, and then passes down through the pebble bed 30, being heated to about 4000° F. In passing down through the combustion bed 28 this air is still further heated by the hot fragments to the desired temperature of 4200 to 4300° F., and at this temperature about 2½ to 3% of nitric oxide is formed in the air. This nitric oxide rich air at the full reaction temperature of about 4200 to 4300° F. then passes into the bottom zone of the bed 28 and into the vicinity of the ports 19 in the furnace wall.

During this operation, the reversing valve 40 supplies recycled nitric oxide containing gas which has been produced in this or a similar furnace and had preferably been cooled in a spray tower, hereinabove referred to but not shown, to about 950° F., into the pipe 38 and from there into the secondary windbox 15. From this windbox it passes down through the bed of particles in the annular space 20, being steadily heated as it passes through these particles until it acquires the temperature of from 3000 to 3200° F., and a very high velocity at the port where it issues from the surrounding chamber 20, through the ports 19 into the main furnace chamber.

This recycled flue gas should be in an amount equal to about 25 to 50% of the flow passing through the furnace proper inside of the shell 17. The bed 26, comprised of quite small particles, offers a high resistance to flow and, because of the large volume of gas introduced at high velocity through the ports 19, this recycled flue gas "pancakes" out, mixing very thoroughly with the nitric oxide bearing gas flowing downwardly at maximum temperature from the reaction zone, cooling it almost instantly to about 3800° F. or even lower. At this temperature, and below, the rate of decomposition of nitric oxide is very much retarded. There will be very little decomposition of the nitric oxide in the recycled gas since the temperature of this gas is never raised to that required for rapid decomposition. The recycled gas entering through the ports 19 has, therefore, almost as high a concentration of nitric oxide as the gas issuing from the reaction zone and on this account the almost instantaneous chilling which is obtained by mixing with the colder recycled gas does not result in dilution of the nitric oxide content. If dilution were permissible, air could be used for shock chilling but this would defeat its end because of the dilution of the nitric oxide content which it would cause. A partial dilution may be permissible on economic grounds by mixing the upstream gas with the downstream gas of the furnace. When this is done, the recycled nitric oxide containing gas will necessarily have a somewhat lower concentration of nitric oxide than that issuing from the reaction zone.

The mixed gas resulting from the downstream flow through the bed 28, that is, the main flow through the furnace proper, and the gas issuing from the ports 19 then passes through the intermediate beds 26 and 25 and into the lower pebble bed 24. In order to continue the rapid chilling without interruption, the pebbles in the top of this bed 24 and in the beds 25 and 26 should be at a temperature of about 3600° F., or even lower, and this temperature may be obtained and carefully controlled by the overblow air passing therethrough on the upstream cycle since the amount of overblow air can, of course, be accurately controlled.

The result of the above described operation on the downstream cycle is a concentration of 2% or more of nitric oxide in the air which passes out of the furnace on downstream operation through the conduit 35 to the adsorption system (not shown). This nitric oxide rich gas passing to the adsorption system may then be collected or treated, as desired, to produce nitrates, nitric acid or $NO_2$.

The duration of the downstream cycle is usually the same as that of the upstream cycle, but variations may often be practiced in either in order to control the proper operation of the furnace.

As has already been stated, the gas leaving the furnace on the upstream cycle, and having a lower concentration of nitric oxide, may go to the adsorption system. If, for example, the downstream gas contains 2.5% nitric oxide and the upstream air contains 1.2% nitric oxide and the two are mingled in the same collection system, the average output will contain around 1.85% nitric oxide. It is, therefore, entirely a question of management and of economy as to whether it is better to discard the upstream flue gas or pass it to the collection system. To do the latter will credit the furnace with a larger output of nitric oxide, but the cost of collection will be greater.

It will be apparent that in the present invention the overblow of my earlier applications may be used to cool the pebble bed on the upstream air heating cycle, but that the equivalent result may also be obtained on the downstream cycle by recycling some of the gas, which is the product of the furnace, and mingle it with the fresh nitric oxide rich gas in a novel way to produce practically instantaneous chilling from the top temperature to that of about 3800° F. It is possible in the present invention to entirely omit the air overblow and to depend entirely upon recycling the nitric oxide containing gas for chilling, but ordinarily it will be preferred to use some of the overblow as a regulator of the temperature in beds 25 and 26 and to depend for the first and most critical chilling upon the recycled gas.

An alternative method to that hereinbefore described consists in the use of hydrogen, either in the starting of the furnace or rather in bringing the interior of the furnace up to the desired temperature or in the use of hydrogen instead of natural gas or water gas. It is more difficult to bring the furnace to the highest desired temperature with the use of heavier fuel gases, such as natural gas or water gas, than it is with hydrogen. I often find it advantageous to speedily bring the furnace to the highest temperature by the use of hydrogen as fuel and then, having reached this temperature, using the heavier fuels which are ordinarily more readily available and which will maintain the temperature satisfactorily.

Hydrogen, on account of its extreme lightness, will be diffused with great rapidity throughout the combustion or reaction zone, causing a very rapid rate of combustion. There will be produced, when hydrogen is burned, a greater amount of water vapor which will be condensed in the collecting system and will lead to a greater concentration of nitric oxide content of the gas. The use of hydrogen has certain definite advantages, one being the higher temperature which it is possible to secure during the combustion in the reaction zone and the other the extremely rapid diffusion of the gas through the reaction zone, which produces the rapid rate of combustion already referred to.

I contemplate the possibility of using in lieu of pure hydrogen the so-called by-product hydrogen which results from the thermal cracking of natural gas to produce carbon black. Such hydrogen usually contains about 80% $H_2$.

Other modes of applying the principle of my invention may be employed instead of the one explained, change being made as regards the means and the steps herein disclosed, provided those stated by any of the following steps or their equivalent be employed.

I therefore particularly point out and distinctly claim as my invention:

1. A process for making nitric oxide from gas containing nitrogen and oxygen comprising the steps of passing a stream of said gas through a bed of refractory particles having a temperature substantially above atmospheric temperatures to preheat said gas and then passing said gas through a second adjacent bed of refractory particles having a temperature in excess of 4000° F. for heating said gas to a temperature to produce a substantial concentration of nitric oxide, and then through an adjacent third bed of refractory particles having a lower temperature to cause rapid chilling of the gas containing nitric oxide, while simultaneously introducing a second gas containing nitric oxide at a lower temperature with rapid mixing with the first gas into a zone adjacent the contiguous portions of the second and third beds, referred to above, to increase the rate of chilling of the first gas over the temperature range of most rapid decomposition of nitric oxide whereby the nitric oxide content of the first gas produced in the said second bed may be removed from the furnace with a minimum amount of reversion to nitrogen and oxygen.

2. In apparatus of the character described, the combination of a main furnace chamber, a concentrically disposed surrounding chamber, a series of beds of refractory particles in said furnace chamber, including a reaction bed, a corresponding series of beds of refractory particles in said surrounding chamber, fuel ducts terminating in said reaction bed in said main furnace chamber, ducts connecting said two chambers at substantially the level of the bottom of such reaction bed, and means for selectively causing the flow of gas in opposite directions through said two chambers.

3. In a process for forming nitric oxide from a gas containing nitrogen and oxygen, the steps comprising passing such gas in alternate upward and downward runs through successive beds of refractory bodies in a shaft furnace, said beds comprising an intermediate bed of relatively large bodies and adjacent upper and lower regenerative beds of relatively small bodies, heating said intermediate bed during at least a part of a run in one direction by injection of a fluid combustible adjacent the junction of said intermediate bed with that one of said beds of relatively small bodies which is first contacted by such gas, and cooling one of said beds of relatively small bodies and the gas passing therethrough during at least a portion of a run in one direction by injection of a fluid coolant adjacent the junction of said intermediate bed with that one of said beds of relatively small bodies which is last contacted by such gas, said fluid coolant being injected at a temperature substantially lower than the temperature imparted to the run gas by the heat in said intermediate bed from the combustion of the combustible fluid and at which the nitric oxide content present is relatively stable.

4. In a process of making nitric oxide from a gas containing nitrogen and oxygen, the steps comprising passing said gas in pre-heated condition into a bed of refractory particles heated to a temperature sufficient to produce a substantial content of nitric oxide therein, passing such formed stream of nitric oxide containing gas into a second contiguous bed of refractory particles at a lower temperature, and simultaneously substantially increasing the cooling effect of such second bed upon the nitric oxide containing gas to a shock-chilling intensity by intimately intermingling with said gas stream adjacent the junction of said beds a second nitric oxide containing gas at a substantially lower temperature, whereby said gas stream is chilled substantially instantaneously to a temperature below that of rapid decomposition of nitric oxide.

5. In a process for making nitric oxide from a gas containing nitrogen and oxygen in which said gas is passed into a reaction zone maintained at a temperature to produce a substantial amount of nitric oxide and the reacted gas then passed into a pebble chilling bed, the step of introducing into the reacted gas simultaneously with its entrance and into the zone of its entrance into the pebble chilling bed a substantial amount of a cooler gas containing nitric oxide, thereby causing an intimate admixture of the cooler gas and the reacted gas and a shock chilling of the reacted gas by the conjoint additive action of the cooler gas and the chilling bed, said shock chilling taking place at a sufficiently rapid rate to prevent substantial decomposition of the produced nitric oxide.

6. In a process for making nitric oxide from a gas containing nitrogen and oxygen in which said gas is passed into a reaction zone maintained at a temperature to produce a substantial amount of nitric oxide and the reacted gas then passed into a pebble chilling bed, the step of introducing into the reacted gas at an angle to its flow simultaneously with its entrance and into the zone of its entrance into the pebble chilling bed a substantial amount of a cooler gas containing nitric oxide at a temperature substantially lower than the temperature of the reacted gas and at a temperature materially lower than the decomposition temperature of the formed nitric oxide, thereby causing an intimate admixture of the cooler gas and the reacted gas and a shock chilling of the reacted gas by the conjoint additive action of the cooler gas and the chilling bed, said shock chilling taking place at a sufficiently rapid rate to prevent substantial decomposition of the produced nitric oxide.

7. A process for making nitric oxide substantially free from gases of combustion from a reaction gas containing nitrogen and oxygen, said reaction gas passing through the refractory beds in one direction only, wherein a plurality of refractory beds are used, one being used for forming nitric oxide and another being used for cooling the formed nitric oxide, which comprises, forming the nitric oxide by passing said reaction gas through a first bed of refractory particles maintained in a make zone at nitric oxide forming temperature, shock chilling the formed nitric oxide by passing it through a second bed of refractory particles maintained at a lower temperature while simultaneously introducing into the formed nitric oxide at the place of its entrance into said second bed a substantial amount of a cooler gas containing about the same concentration of nitric oxide as said formed nitric oxide gas, removing the nitric oxide containing gas, then reversing the flow by passing air through said second bed to cool it and to support combustion in said first bed, flowing air from said second bed to said first bed in a quantity substantially equal to the quantity necessary for complete combustion of a fuel burned in said first bed to maintain the temperature thereof at nitric oxide forming temperature whereby substantially no nitric oxide is formed therein, and passing the combusted gases on through the particles in said first bed and to the stack at reduced temperature.

ROBERT D. PIKE.

References Cited in the file of this patent

UNITED STATES PATENTS

| Number | Name | Date |
|---|---|---|
| Re. 19,757 | Royster | Nov. 12, 1935 |
| 777,485 | Pauling | Dec. 12, 1904 |
| 882,958 | Pauling | Mar. 24, 1908 |
| 1,011,014 | Bender | Dec. 5, 1911 |
| 1,272,181 | Andreucci | July 9, 1918 |
| 1,940,371 | Royster | Dec. 19, 1933 |
| 2,051,363 | Beekley | Aug. 18, 1936 |
| 2,121,733 | Cottrell | June 21, 1938 |
| 2,171,733 | Cottrell | June 12, 1938 |
| 2,272,108 | Bradley | Feb. 3, 1942 |
| 2,421,744 | Daniels et al. | June 10, 1947 |
| 2,422,081 | Cottrell | June 10, 1947 |

FOREIGN PATENTS

| Number | Country | Date |
|---|---|---|
| 18,475 of 1910 | Great Britain | Aug. 4, 1910 |